US011313622B2

(12) United States Patent
Coutant et al.

(10) Patent No.: US 11,313,622 B2
(45) Date of Patent: Apr. 26, 2022

(54) AIR DISTRIBUTOR MADE OF PLASTIC MATERIAL AND METHOD FOR MANUFACTURING THIS AIR DISTRIBUTOR

(71) Applicant: NOVARES France, Clamart (FR)

(72) Inventors: Thomas Coutant, Saint Laurent Blangy (FR); Vincent Rossignol, Lyons (FR)

(73) Assignee: NOVARES FRANCE, Clamart (FR)

( * ) Notice: Subject to any disclaimer, the term of this patent is extended or adjusted under 35 U.S.C. 154(b) by 55 days.

(21) Appl. No.: 16/342,781

(22) PCT Filed: Oct. 6, 2017

(86) PCT No.: PCT/FR2017/052745
§ 371 (c)(1),
(2) Date: Apr. 17, 2019

(87) PCT Pub. No.: WO2018/073509
PCT Pub. Date: Apr. 26, 2018

(65) Prior Publication Data
US 2019/0257584 A1    Aug. 22, 2019

(30) Foreign Application Priority Data

Oct. 18, 2016 (FR) .................................... 16/60105

(51) Int. Cl.
*F28D 1/03* (2006.01)
*F28F 21/06* (2006.01)
(Continued)

(52) U.S. Cl.
CPC ........... *F28D 1/0341* (2013.01); *F28D 1/035* (2013.01); *F28D 9/0056* (2013.01); *F28F 21/06* (2013.01);
(Continued)

(58) Field of Classification Search
CPC ...... F28D 1/0341; F28D 1/035; F28D 9/0056; F28F 21/06; F28F 2225/02
See application file for complete search history.

(56) References Cited

U.S. PATENT DOCUMENTS 4,246,962 A  *  1/1981  Norback ................. F24F 3/147
                                                        165/166
6,920,918 B2 *  7/2005  Knecht .................... F28F 9/001
                                                        165/157
(Continued)

FOREIGN PATENT DOCUMENTS

CN          2325748        6/1999
CN        101568790       10/2009
(Continued)

OTHER PUBLICATIONS

CN First Office Action for Application No. 2017800643953.
(Continued)

*Primary Examiner* — Leonard R Leo
(74) *Attorney, Agent, or Firm* — Cantor Colburn LLP

(57) ABSTRACT

This air distributor (1) comprises two half-shells (2) made of plastic material and a stack of plates (4) made of plastic material, the two half-shells (2) defining a volume inside of which the stack of plates (4) is positioned, the stack of plates (4) comprising two end plates (40) and the stack of plates (4) defining between its adjacent plates (4) a set of intermediate spaces (10) suitable for a fluid circulation. The plates (4) of the stack of plates (4) are attached to one another, each end plate (40) is attached to one of the two half-shells (2), and the two half-shells (2) are attached to one another.

16 Claims, 4 Drawing Sheets

(51) Int. Cl.
  *F28D 9/00* (2006.01)
  *F02B 29/04* (2006.01)
  *F02M 35/10* (2006.01)
  *F02M 35/104* (2006.01)
(52) U.S. Cl.
  CPC ........ *F02B 29/0475* (2013.01); *F02M 35/104* (2013.01); *F02M 35/10268* (2013.01); *F28F 2225/02* (2013.01); *Y02T 10/12* (2013.01)

(56) References Cited

U.S. PATENT DOCUMENTS

| | | | |
|---|---|---|---|
| 7,610,949 | B2 | 11/2009 | Palanchon |
| 9,709,342 | B2 | 7/2017 | Dornseif et al. |
| 10,619,946 | B2 | 4/2020 | Meshenky et al. |
| 2001/0025704 | A1* | 10/2001 | Jainek .................. F28D 9/0012 165/119 |
| 2005/0224213 | A1 | 10/2005 | Kammler |
| 2009/0090486 | A1 | 4/2009 | Geskes et al. |
| 2012/0103579 | A1 | 5/2012 | Reif et al. |
| 2014/0130764 | A1* | 5/2014 | Saumweber ............ F28F 9/001 123/184.21 |
| 2019/0049195 | A1* | 2/2019 | Meshenky .............. F28F 9/001 |

FOREIGN PATENT DOCUMENTS

| | | |
|---|---|---|
| CN | 103983128 | 8/2014 |
| CN | 105909370 | 8/2016 |
| DE | 202010007615 U1 | 8/2010 |
| DE | 102012013755 A1 | 1/2014 |
| EP | 2508832 | 10/2012 |
| FR | 2879262 A1 | 6/2006 |
| WO | 03078913 A1 | 9/2003 |
| WO | 2007104580 A2 | 9/2007 |
| WO | 2011064090 A2 | 6/2011 |
| WO | 2012080039 A2 | 6/2012 |
| WO | WO-2012080039 A2 * | 6/2012 ............. F28F 3/042 |
| WO | 2015164968 | 11/2015 |

OTHER PUBLICATIONS

CN First Search for Application No. 2017800643953.
CN Second Office Action for Application No. 2017800643953.
Translation to CN First Office Action for Application No. 2017800643953.
Translation to CN Second Office Action for Application No. 2017800643953.
International Search Report for Application No. PCT/FR2017/052745.
English Machine Translation to Abstract of DE102012013755.
English Machine Translation to Abstract of FR2879262.
Written Opinion for Application No. PCT/FR2017/052745.

* cited by examiner

AIR DISTRIBUTOR MADE OF PLASTIC MATERIAL AND METHOD FOR MANUFACTURING THIS AIR DISTRIBUTOR

CROSS REFERENCE TO RELATED APPLICATIONS

This application is a National Stage of PCT Application No. PCT/FR2017/052745 filed on Oct. 6, 2017, which claims priority to French Patent Application No. 16/60105 filed on Oct. 18, 2016, the contents each of which are incorporated herein by reference thereto.

TECHNICAL FIELD

The present invention concerns an air distributor made of plastic material and a method for manufacturing this air distributor.

BACKGROUND

Conventionally, an air distributor, also called intake manifold, comprises an air inlet and several air outlets intended to be connected to a cylinder head of an engine to convey to each cylinder of the engine the air required for the combustion of fuel.

It is known to position a heat exchanger inside the distributor to perform a heat exchange between the air circulating through the distributor in the direction of the engine and one or several fluid(s) circulating through the heat exchanger. The heat exchanger is traditionally formed by a stack of aluminum plates. The plates, generally having a rectangular shape, form a parallelepiped block. Because of the pressures exerted within the heat exchanger, screws and bolt means are added during manufacture to ensure sufficient mechanical strength.

A first disadvantage of these distributors with integrated exchanger is a significant bulk due to the parallelepiped shape of the heat exchanger. This shape does not allow the heat exchanger to optimally occupy the available volume.

A second disadvantage is a by-pass effect existing between the heat exchanger and the distributor. A portion of the air flow entering the distributor by-passes the heat exchanger by passing between the clearances existing between the heat exchanger and the distributor. This by-pass flow lessens the efficiency and prevents obtaining of a homogeneous air temperature at the outlet of the distributor.

Another disadvantage is the duration of the manufacturing method which requires, in order to ensure the mechanical strength, the fastening of screws, bolts or bridges, which are all independent inserts.

BRIEF SUMMARY

Also, the present invention aims at overcoming all or part of these disadvantages by providing an air distributor offering an improved mechanical strength, compactness, and efficiency, as well as a method for manufacturing this distributor, allowing to reduce the manufacturing duration while maintaining a quality mechanical strength.

To this end, the present invention relates to an air distributor comprising two half-shells made of plastic material and a stack of plates made of plastic material, the half-shells delimiting a volume inside which the stack of plates is positioned, the stack of plates comprising two end plates and the stack of plates delimiting between its adjacent plates a set of intermediate spaces adapted to a fluid circulation, in which the plates of the stack of plates are fastened to each other, each end plate is fastened to one of the two half-shells, and the two half-shells are fastened to each other.

Thus, the distributor according to the invention provides an improved mechanical strength, compactness and efficiency.

The fastening the two half-shells directly to each other, combined with the fastening of the plates directly to each other and the end plates to the half-shells, provides an increased pressure resistance.

In addition, the fact that the end plates are secured to the half-shells allows preventing the passage of air between the end plates and the half-shells, in order to avoid a by-pass effect.

The half-shells and the plates are made of plastic material, providing the possibility of being shaped according to a predetermined shape optimally corresponding to a volume available in the proximity of the engine.

According to a preferred embodiment, the plates of the stack of plates are fastened to each other by gluing and each end plate is fastened to one of the two half-shells by gluing, while the two half-shells are fastened to each other by welding.

These characteristics provide an improved pressure resistance, a limited by-pass effect, as well as a time saving during manufacture.

According to a preferred embodiment, the distributor comprises at least one guide and reinforcing column, this column passing through the plates of the stack of plates while connecting the two half-shells.

Thus, the mechanical strength is improved.

According to a preferred embodiment, at least one of the two half-shells and the end plate fastened against it delimit therebetween an intermediate space adapted to a fluid circulation, this intermediate space being in fluid communication with at least one of the intermediate spaces of the set of intermediate spaces.

This configuration allows improving the efficiency by allocating the maximum of the space available in the distributor to the heat exchange function.

According to a preferred embodiment, at least one of the two half-shells and the end plate fastened against it comprise interlocking elements configured to allow the interlocking this half-shell and this end plate.

The interlocking elements assist in the proper positioning of the end plate relative to the half-shell, allowing to reduce the assembly duration. The interlocking elements also limit the by-pass effect.

According to a preferred embodiment, the interlocking elements comprise a groove and a rib intended to be positioned inside the groove, this groove and this rib being shaped to extend according to the shape of the contour of the end plate fastened to this half-shell.

This allows effectively reducing the by-pass effect.

The groove may in turn be delimited by two parallel ribs. The groove is advantageously wider than the rib, so that there is a clearance on either side of the rib when it is inserted into the groove. Preferably, the glue used to fasten the end plates to the corresponding half-shells is deposited inside the groove. This clearance requires a very accurate positioning of the end plate vis-à-vis the corresponding half-shell. To do this, the air distributor may comprise positioning members of the gadroon or splines type.

According to a preferred embodiment, the plates of the stack of plates each comprise two deflector elements extending from one side of the plates, the deflector elements of the adjacent plates being arranged to be superimposed in order to form a deflector wall intended to impede a passage of air between the plates and the half-shells.

Thus, the air entering the distributor is guided to the corresponding intermediate spaces of the stack of plates, instead of slipping between the stack of plates and the half-shells. This allows limiting the by-pass effect.

According to another aspect, the invention relates to a vehicle, in particular a motor vehicle, comprising an air distributor having the aforementioned characteristics.

This vehicle benefits from a distributor with integrated heat exchanger providing an improved compactness and efficiency due to the optimal occupancy of the space available in the proximity of the engine.

According to another aspect, the invention also relates to a method for manufacturing an air distributor, in which the manufacturing method comprises:

fastening the adjacent plates of the stack of plates to each other, fastening the end plates respectively to both of the two half-shells, fastening the half-shells to each other.

The method according to the invention allows saving manufacturing time while ensuring high pressure resistance.

According to a preferred embodiment, the plates of the stack of plates are fastened to each other by gluing and each end plate is fastened to one of the two half-shells by gluing, while the two half-shells are fastened to each other by welding.

Thus, the method allows dispensing with the screwing and bolting steps, and thus reducing the manufacturing duration.

According to a preferred embodiment, the welding of the half-shells occurs after gluing the plates together and each end plate to the corresponding half-shell.

This results in a substantial manufacturing time saving to the extent that the polymerization of the glue takes place during and after the welding of the half-shells, in masked time.

In addition, the polymerization of the adhesive is not completed at the time of welding, and the welding involving a dimensional variation which tends to bring the half-shells closer together, an effect of clasping of the plates is obtained during welding, which improves the pressure resistance.

According to a preferred embodiment, all the plates of the stack of plates are beforehand glued to each other so as to form a block, this block being then fastened to the half-shells by gluing each end plate to the corresponding half-shell.

This characteristic allows reducing the manufacturing duration.

According to a preferred embodiment, one of the half-shells comprises at least one guide and reinforcing column, and wherein the method comprises a step of positioning the plates relative to one of the half-shells by translating the plates along the guide and reinforcing column inserted through an opening of the plates of the stack of plates.

An advantage of these characteristics is a more accurate and faster positioning of the plates relative to the corresponding half-shell.

According to a preferred embodiment, the guide and reinforcing column is formed integrally with one of the half-shells.

Given the strength of the connection thus obtained between the guide and reinforcing column and the corresponding half-shell, the column may be narrower, so that the surface of the heat exchange between the plates is larger. The efficiency is consequently improved without prejudice to the pressure resistance.

BRIEF DESCRIPTION OF THE DRAWINGS

Other characteristics and advantages of the present invention will clearly emerge from the following detailed description of an embodiment, given as a non-limiting example, with reference to the appended drawings in which.

DETAILED DESCRIPTION

Figure 1:
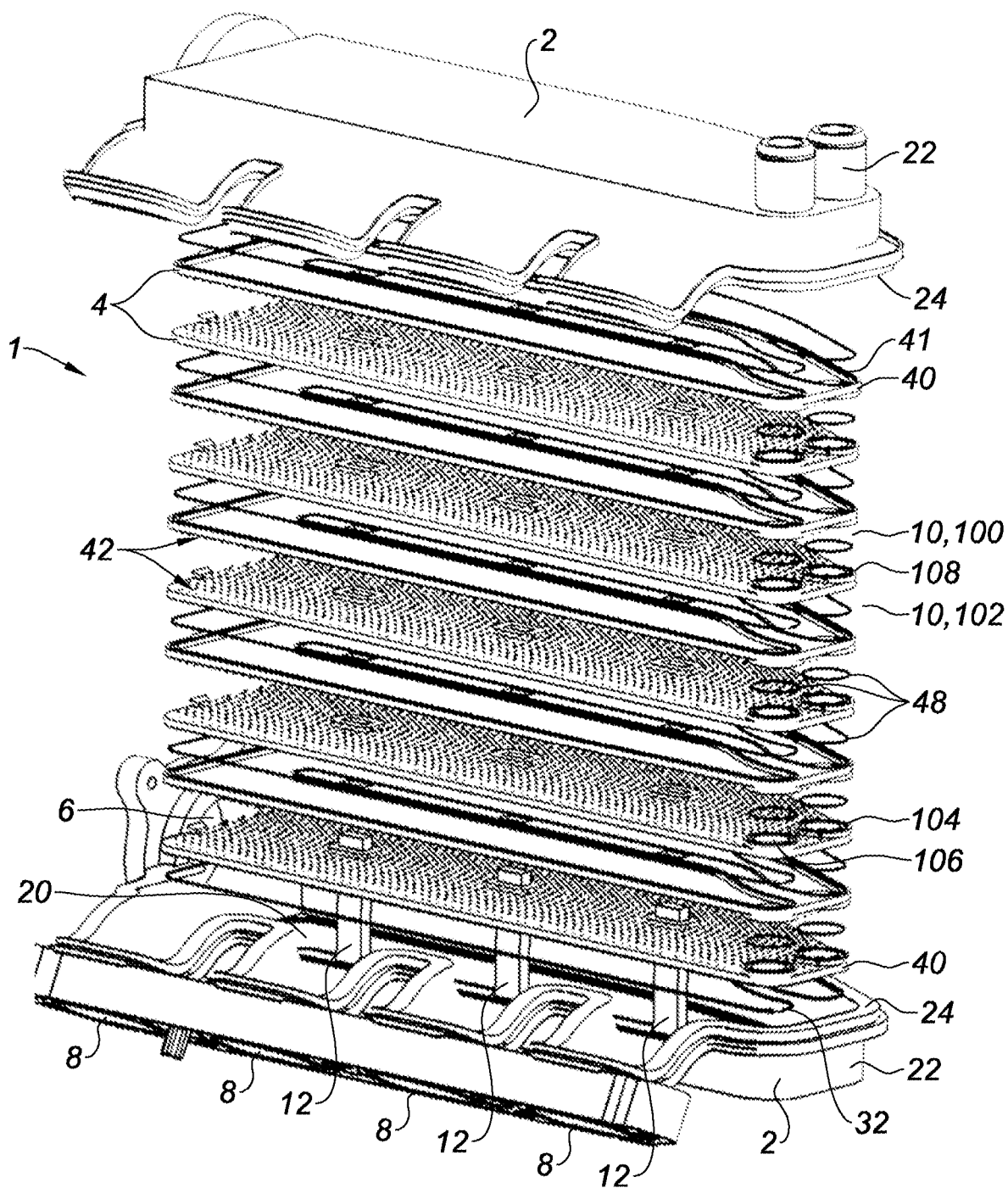
FIGS. 1 and 2 are exploded and perspective views of a distributor according to an embodiment of the invention.
Figure 2:
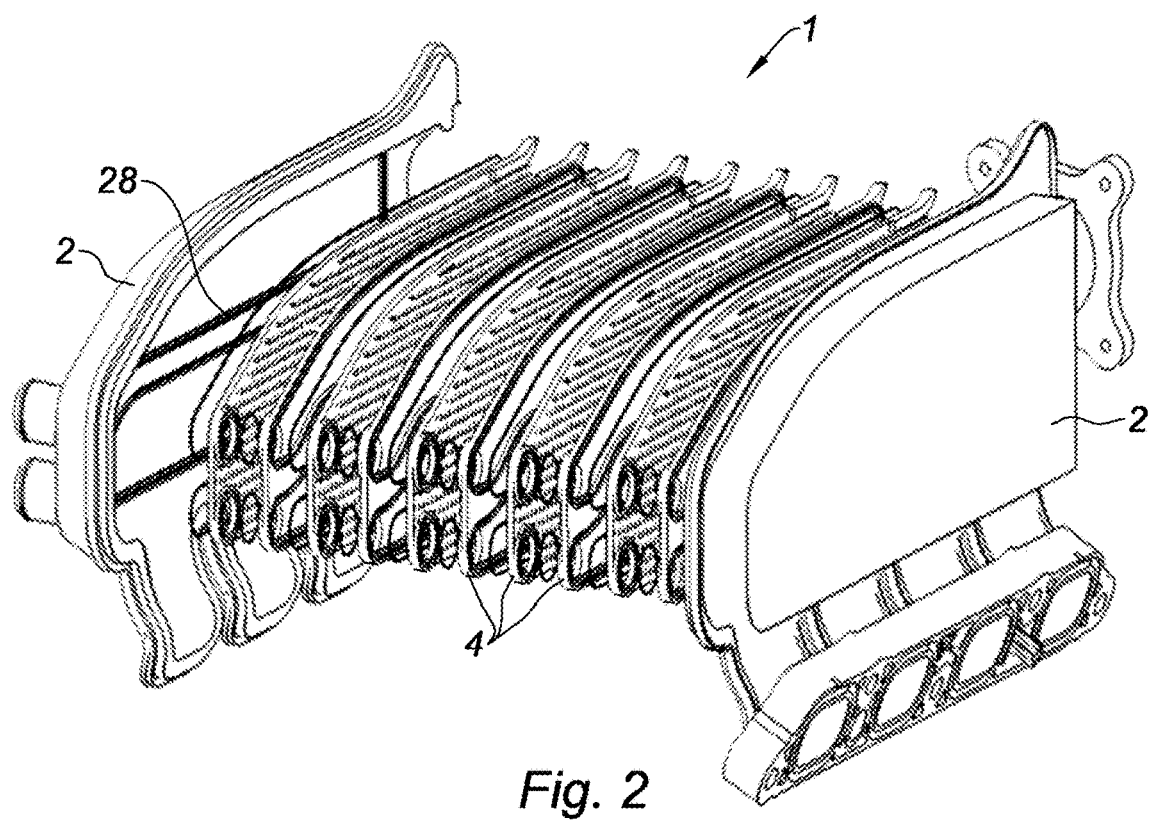

FIGS. 1 and 2 show an air distributor 1 according to an embodiment of the invention. The air distributor 1 comprises two half-shells 2 and a stack of plates 4. The stack of plates 4 forms a heat exchanger. The two half-shells 2 delimit therebetween a volume intended to receive the stack of plates 4.

Figure 3:
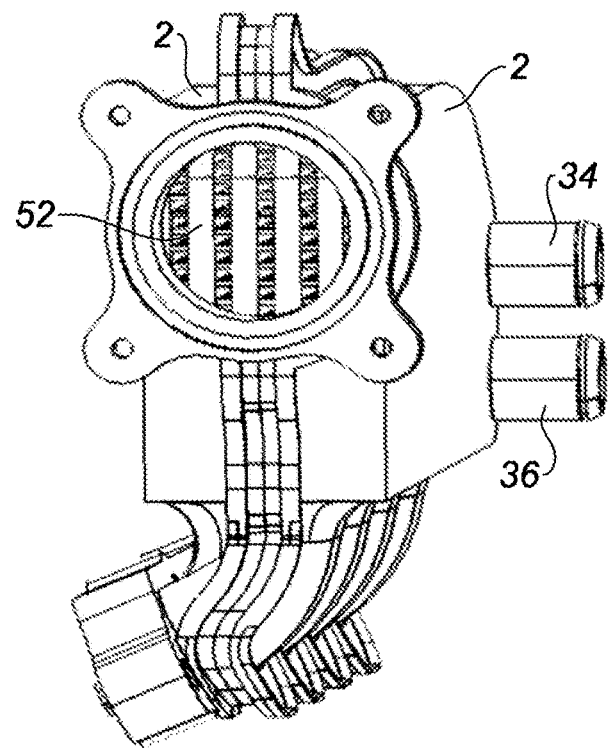
FIG. 3 is a side view of a distributor according to an embodiment of the invention.

The air distributor 1 also comprises an air inlet 6 and several air outlets 8 intended to be connected to a cylinder head of an engine (not shown) in order to convey to each cylinder of the engine the air necessary for the combustion of fuel. The air inlet 6 and the air outlets 8 open into the volume delimited by the two half-shells 2. The heat exchanger formed by the stack of the plates 4 is arranged between the inlet 6 and the outlets 8, so that the air entering the distributor 1 passes through the stack of plates 4 to undergo a heat transfer before exiting. The conduits delimiting the inlet 6 and the outlets 8 may be formed integrally with one or both of the two half-shells 2, and may be formed due to the assembly of the two half-shells, as illustrated in FIGS. 1 to 3.

The air distributor 1 is made of plastic material. More precisely, the plates 4 of the stack of plates 4 are made of plastic material including a thermally conductive filler, for example polyamide 66 (PA66) comprising a graphite and/or carbon filler, in order to provide a thermal conductivity at 20° C. greater than 0.6 $W \cdot m^{-1} \cdot K^{-1}$, preferably equal to or greater than 1 $W \cdot m^{-1} \cdot K^{-1}$.

The half-shells 2 are also made of plastic material, preferably distinct from the plastic material constituting the plates 4, intended to withstand high pressures, for example up to about nine bars, and high temperatures in the order of, for example, about 200 to 220° C. This plastic material may be in particular polyamide 6 (PA6) or 66 (PA66).

The use of plastic material allows making distributor shapes that can be optimally inserted into the spaces available in the proximity of the engine, and to ensure that the heat exchanger formed by the plates occupies a maximum of the volume available inside the distributor, so as to have a high efficiency.

The stack of plates 4 comprises plates 4 stacked one after the other in a predetermined stacking direction, for example rectilinear stacking direction. The stack of plates 4 comprises a plurality of plates 4, including two end plates 40 between which the other plates 4 extend. The plates 4 may be of the same shape and the same dimensions.

The stack of plates 4 delimits, between the adjacent plates 4, a set of intermediate spaces 10. Each intermediate space 10 is intended for a fluid circulation between the plates 4 to allow in particular a heat exchange between the fluid circulating in this intermediate space 10 and an adjacent intermediate space.

The set of intermediate spaces here comprises open intermediate spaces 100 and closed intermediate spaces 102. Preferably, the open intermediate spaces 100 and the closed intermediate spaces 102 are alternately disposed in the stacking direction.

The closed spaces 102 are fluidly connected to each other in order to allow a fluid circulation through all these closed intermediate spaces 102. Thus, the heat exchanger comprises a fluid intake channel and discharge channel, which may be formed by a plurality of inlet openings 104 and outlet openings 106, optionally surrounded by a peripheral wall 108, and for example formed through the plates 4, each plate 4 having an inlet opening 104 and an outlet opening 106. The distributor 1 further comprises a fluid intake opening 34 and a fluid discharge opening 36 passing through one of the two half-shells 2 and each opening into one of the closed intermediate spaces 102 to allow the inlet and the outlet of fluid in the closed intermediate spaces.

The open intermediate spaces 100 have an inlet opening communicating with the air inlet 6 of the distributor and an outlet opening communicating with the air outlets 8 of the distributor 1. The open intermediate spaces 100 are therefore here intended for the air circulation while the closed intermediate spaces 102 may be intended for the circulation of a heat transfer fluid, for example glycol water, intended to exchange heat with the air passing through the distributor 1 and the open intermediate spaces 100.

Figure 4:
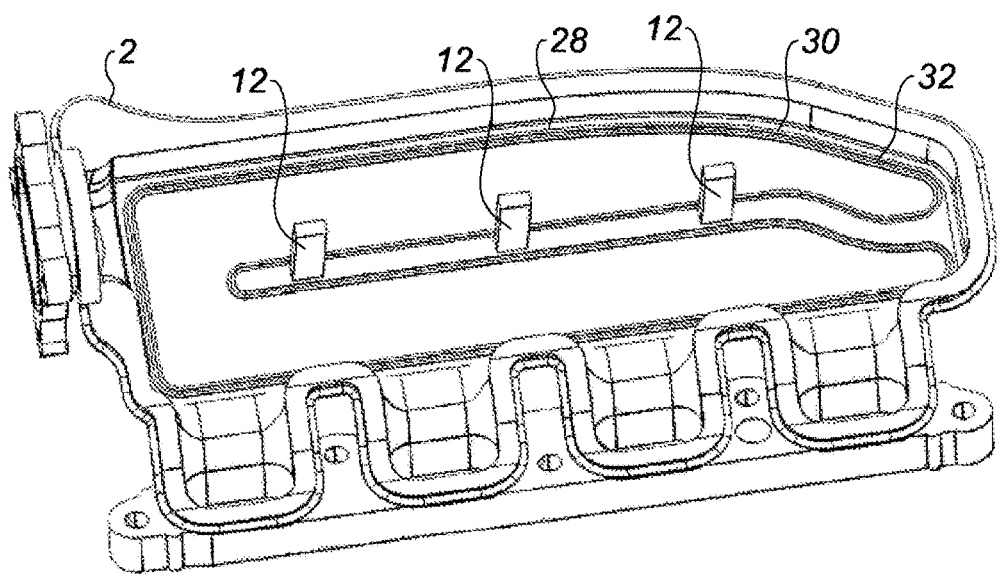
FIG. 4 is a top view of a half-shell of a distributor according to an embodiment of the invention.

As visible in FIGS. 2 and 4, one or both of the two half-shells 2 can delimit with the corresponding end plate 40 a closed intermediate space 102 communicating with the other closed intermediate spaces 102.

In order to ensure a high pressure resistance, the plates 4 of the stack of plates 4 are fastened, in particular glued to each other, while the two half-shells 2 are directly fastened, in particular welded, to each other. In addition, the end plates 40 are respectively fastened, in particular glued, to both of the two half-shells 2.

It will thus be noted that the plates 4 are only fastened together. Only the end plates 40 are fastened to the half-shells 2, in particular to a bottom wall 20 of the half-shells 2. There is therefore a clearance here between the section of the plates 4 and the half-shells 2, in particular a side wall 22 of the half-shells 2.

«Directly fastened to each other» means fastened in contact with each other, and not via a part interposed between the portions fastened to each another.

Preferably, the plates of the stack of plates are fastened to each other by gluing.

Each end plate is preferentially fastened to one of the two half-shells by gluing.

The two half-shells are advantageously fastened to each other by welding.

No screws or bolts are necessary to reinforce the mechanical strength of the distributor 1.

Preferably, the welding interface of the half-shells is in a plane substantially orthogonal to the stacking direction of the plates 4, so that the welding operation has the effect that the half-shells 2 clasp the plates 4.

The weld bead binding the half-shells 2 is advantageously continuous and preferably follows the edge 24 or outer contour of the half-shells 2.

According to the example illustrated in FIGS. 1 and 2, each half-shell 2 has a bottom wall 20 and a side wall 22. The two half-shells 2 are here fastened, in particular welded, at the edge 24 located at the end of their side wall 22. Alternatively, only one of the two half-shells 2 may have a side wall 22 and the other of the two half-shells 2 may be formed only by a bottom wall 20. The edge 24 of the side wall 22 of the first half-shell 2 is then directly fastened on the wall 20 forming the second half-shell 2.

The glue used for gluing the plates 4 together or for gluing the end plates 40 to the respective half-shells 2 is, for example, of the epoxy glue or silicone-based glue type, allowing in particular to withstand the relatively high temperatures within the heat exchanger.

The welding of the half-shells 2 can be performed by vibration, infrared, or a combination of both. Preferably, the half-shells 2 are welded by infrared, which provides a better property to the assembled parts, particularly sought for a distributor.

As illustrated in FIGS. 1 and 4, the distributor 1 advantageously comprises one or more guide and reinforcing columns 12 allowing to reinforce the pressure resistance of the distributor 1. The guide and reinforcing columns 12 join the two half shells 2. These columns 12 have an end secured to one of the two half-shells 2 and an opposite end secured to the other of the two half-shells 2.

Preferably, as visible in the figures, the columns 12 are formed integrally with one of the two half-shells 2 and fastened, in particular welded, at their end on the other half-shell 2, which allows reducing the manufacturing duration while improving the mechanical strength.

It will be noted that the columns 12 are advantageously rectilinear and can extend along the stacking direction. The columns 12 pass through the plates 4 of the stack of plates 4 in order to join the bottom walls 20 of the two half-shells 2. The plates 4 are thus provided with through openings 46, here aligned, through which the columns 12 extend.

One or both of the two half-shells and the corresponding end plate(s) may comprise interlocking elements, formed for example by a complementary groove 30 and rib 41. The groove 30 may be formed inside a rib 28 protruding from the bottom wall 20, as visible in FIGS. 1, 2 and 4, while the corresponding end plate 40 comprises the complementary rib 41 of this groove. The rib 28 draws the contour of the corresponding end plate 40, that is to say has substantially the shape of the contour of this end plate 40, and is intended to bear against the edge of the face 42 of the end plate 40 facing the half-shell 2. The rib 28 materializes the area where to apply for example the glue. Thus, the end plate 40 is fastened to the corresponding half-shell 2 at the interlocking between the groove 30 and the rib 41. A seal 32, visible in particular in FIGS. 1 and 4, can be positioned in groove 30.

It will be noted that seals 48 may be provided between the adjacent plates 4 to ensure the sealing of the stack of plates 4, particularly of the closed intermediate spaces 102. The seals 48 may be arranged within the gluing areas connecting the plates 4 together and, where appropriate, the end plates 40 to the respective half-shells 2.

Figure 5:
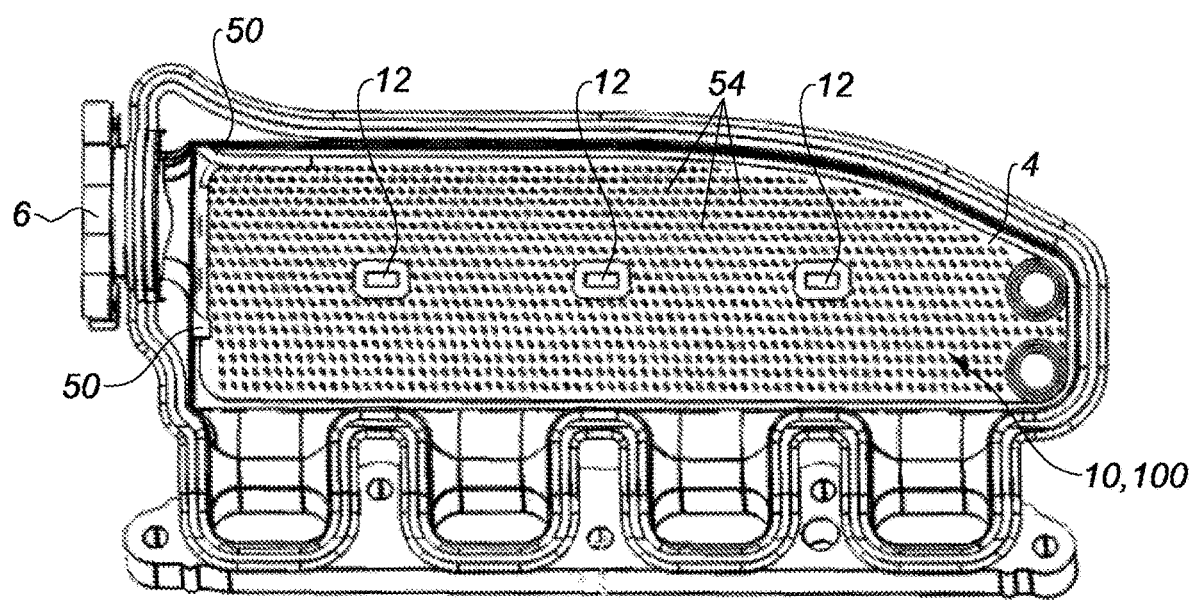
FIG. 5 is a top view of a half-shell and a plate of a distributor according to an embodiment of the invention.
Figure 6:
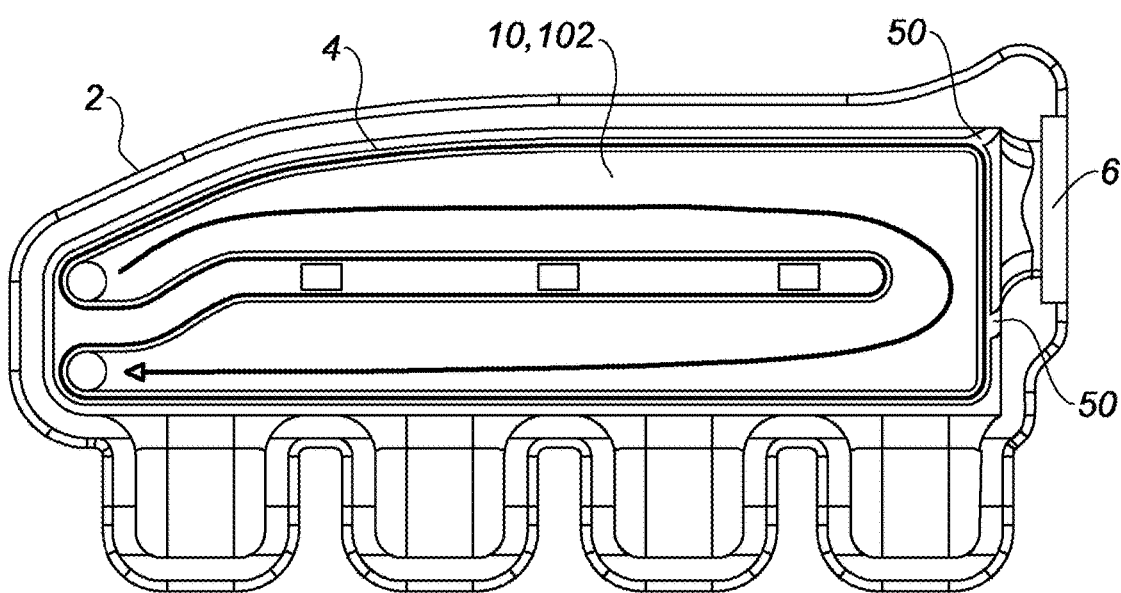
FIG. 6 is a top view of a half-shell and a plate of a distributor according to an embodiment of the invention.

As illustrated in FIGS. 5 and 6, the plates 4 of the stack of plates 4 each comprise two deflector elements 50 extending from one side of the plates 4, to the side wall 42 of either of the two half-shells 2. These deflector elements 50 extend on either side of the air inlet 6 of the distributor, and partly delimit the inlet opening of the open intermediate spaces 100. Thus, the deflector elements 50 prevent the air entering the distributor 1 from passing between the heat exchanger and the side wall 42 of the distributor 1, which limits the by-pass effect. The deflector elements 50 of the plates 4 are arranged to be superimposed, as visible in FIG. 7, so that the set of deflector elements 50 form a deflector wall intended to impede a passage of air between the heat exchanger and the distributor 1. The end of the deflector elements 50 is bearing against either of the half-shells 2, preferably secured to the latter, for example glued to the corresponding half-shell 2.

Figure 7:
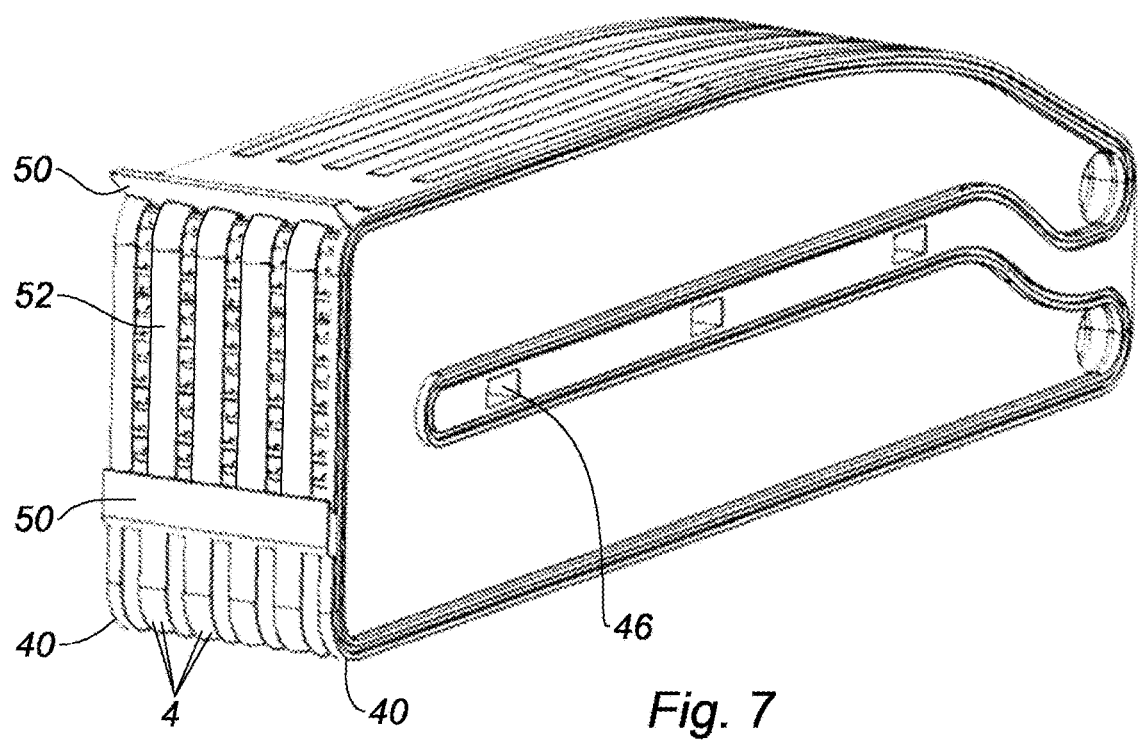
FIG. 7 is a perspective view of a stack of plates of a distributor according to an embodiment of the invention.

As illustrated in FIG. 7, the plates 4 may have a leading edge 52 shaped to promote a laminar flow at the inlet of the open intermediate spaces 100.

Furthermore, as visible in FIG. 5, the plates 4 can have obstacles or spikes 54 protruding on a face 42, partly delimiting for example an open intermediate space 100. This promotes a turbulent flow within the intermediate spaces in order to improve the heat exchange efficiency.

The invention also concerns a vehicle, in particular a motor vehicle, comprising the air distributor 1 having all or part of the characteristics described above.

The invention also relates to a method for manufacturing an air distributor 1 having all or part of the characteristics described above, therefore comprising in particular two half-shells 2 made of plastic material and a stack of plates 4 made of plastic material, the half-shells 2 delimiting a volume inside which the stack of plates 4 is positioned, this stack of plates 4 comprising two end plates 40 and delimiting between its adjacent plates 4 a set of intermediate spaces 10 adapted to a fluid circulation. The plates 4 and/or the half-shells 2 can be produced by injection molding.

The manufacturing method comprises fastening, preferably gluing, the adjacent plates 4 of the stack of plates 4 to each other, fastening, preferably gluing, the end plates 40 respectively to both of the two half-shells 2, and fastening, preferably welding, the half-shells 2 directly together.

It will thus be noted that the plates 4 are only fastened together. Only the end plates 40 are fastened to the half-shells 2. No screws or bolts are necessary to reinforce the mechanical strength of the distributor 1.

Preferably, the welding interface of the half-shells is in a plane substantially orthogonal to the stacking direction of the plates 4, so that the welding operation has the effect that the half-shells 2 clasp the plates 4.

The weld bead binding the half-shells 2 is advantageously continuous and preferably follows the edge 24 or outer contour of the half-shells 2.

The glue used for gluing the plates 4 together or for gluing the end plates 40 to the respective half-shells 2 is, for example, of the epoxy glue or silicone-based glue type, allowing in particular to withstand the relatively high temperatures within the heat exchanger.

The welding of the half-shells 2 can be performed by vibration, infrared, or a combination of both. Preferably, the half-shells 2 are welded by infrared, which provides a better property to the assembled parts, particularly sought for a distributor.

Preferably, the welding of the half-shells 2 occurs after gluing the plates 4 together and each end plate 40 to the corresponding half-shell 2, but before the complete polymerization of the glue(s) used for these gluings. This allows a significant time saving in terms of manufacturing duration, because the crosslinking of the glue occurs in masked time. Moreover, the effect of welding, given the dimensional variation that it generates, is to bring the half-shells 2 closer together; the latter therefore clasp the stack of plates 4 before polymerization of the glue binding the plates 4 together and the end plates 40 to the respective half-shells 2.

Optionally, the method may comprise a step of compressing the half-shells against each other during the welding and/or during the duration of polymerization of the glue binding the plates 4 together and the end plates 40 to half-shells 2.

The method may also comprise a step of positioning the plates 4 relative to one of the half-shells 2 by inserting the plates 4 of the stack of plates 4 on the guide and reinforcing column(s) 12 through the corresponding opening(s) 46 of the plates 4 of the stack of plates 4.

This positioning step may advantageously comprise a step of pre-gluing the plates 4, including the end plates 40, so as to form beforehand a block constituting the stack of plates 4, as visible in FIG. 7. This block is then positioned relative to one of the two half-shells 2, where appropriate by translation along the columns 12 inserted into the openings 46, and glued to this half-shell 2 via the corresponding end plate 40. The other half-shell 2 is then glued to the other end plate 40, then the half-shells are welded to each other.

Alternatively, the positioning step can be performed plate 4 by plate 4, starting with the end plate 40 which once in place is glued to the corresponding half-shell 2. The other plates 4 being glued to each other as and when they are positioned, ending with the other end plate 40 and its gluing to the other half-shell 2. The half-shells 2 are then welded to each other.

It will be noted that the columns 12 are advantageously molded integrally with either of the two half-shells 2, which allows an improved time saving and final robustness.

The method may comprise, where appropriate, gluing the end of the deflector elements 50 to the half-shells 2 in order to eliminate the by-pass effect.

Of course, the invention is in no way limited to the embodiment described above, this embodiment having been given only as an example. Modifications are possible, in particular from the point of view of the constitution of the various devices or by the substitution of technical equivalents, without departing from the scope of protection of the invention.

The invention claimed is:

1. An air distributor comprising an air inlet and several air outlets, each of the air outlets being intended to be connected to a cylinder head of an engine, two half-shells made of plastic material and delimiting an internal volume opened to the air inlet and outlets, a stack of plates made of plastic material and arranged inside the internal volume between the air inlet and the air outlets such that air flow entering through the air inlet passes through the stack of plates before exiting through the air outlets, the stack of plates comprising two end plates and the stack of plates delimiting between adjacent plates of the stack of plates a set of intermediate spaces adapted to a fluid circulation, wherein each plate of the stack of plates are fastened to each other, each end plate is fastened to one of the two half-shells and the two half-shells are fastened to each other, and wherein the distributor comprises at least one guide and reinforcing column, the at least one guide and reinforcing column passing through each plate of the stack of plates while connecting the two half-shells, and wherein the at least one guide and reinforcing column is formed integrally with one of the two half-shells, wherein at least one of the two half-shells and the end plate fastened against the at least one of the two half-shells comprise interlocking elements configured to allow the interlocking of the at least one of the two half-shells and the end plate fastened against the at least one of the two half-shells.

2. The distributor according to claim 1, wherein each plate of the stack of plates are fastened to each other by gluing, while the two half-shells are fastened to each other by welding.

3. The distributor according to claim 2, wherein at least one of the two half-shells and one of the two end plates fastened against the at least one of the two half-shells delimit therebetween an intermediate space adapted to a fluid circulation, the intermediate space being in fluid communication with at least one of the intermediate spaces of the set of intermediate spaces.

4. The distributor according to claim 3, wherein the interlocking elements comprise a groove and a rib intended to be positioned inside the groove, the groove and the rib being shaped to extend according a shape of a contour of the one of the two end plates fastened to the at least one of the two half-shells.

5. The distributor according to claim 4, wherein each plate of the stack of plates comprise two deflector elements extending from one side of each plate of the stack of plates, the two deflector elements of adjacent plates of the stack of plates being arranged to be superimposed in order to form a deflector wall configured to impede a passage of air between each plate of the stack of plates and the two half-shells.

6. The distributor according to claim 1, wherein at least one of the two half-shells and one of the two end plates fastened against the at least one of the two half-shells delimit therebetween an intermediate space adapted to a fluid circulation, the intermediate space being in fluid communication with at least one of the intermediate spaces of the set of intermediate spaces.

7. The distributor according to claim 1, wherein the interlocking elements comprise a groove and a rib intended to be positioned inside the groove, the groove and the rib being shaped to extend according a shape of a contour of the end plate fastened to the at least one of the two half-shells.

8. The distributor according to claim 1, wherein each plate of the stack of plates comprise two deflector elements extending from one side of each plate of the stack of plates, the two deflector elements of adjacent plates of the stack of plates being arranged to be superimposed in order to form a deflector wall configured to impede a passage of air between each plate of the stack of plates and the two half-shells.

9. The distributor according to claim 1, wherein a fastening interface of the two half-shells is in a plane orthogonal to a stacking direction of the plates of the stack of plates, so that the two half-shells clasp the plates of the stack of plates in the stacking direction of the plates.

10. The distributor according to claim 1, wherein the air inlet and outlets are formed integrally with one or both of the two half-shells.

11. The distributor according to claim 1, wherein a shape of the stack of plates is a non-parallelepiped shape.

12. A vehicle, in particular a motor vehicle, comprising an engine and an air distributor according to claim 1, wherein a shape of the air distributor corresponds to a shape of a volume available in the proximity of the engine.

13. A method for manufacturing an air distributor according to claim 1, wherein the manufacturing method comprises:
fastening the adjacent plates of the stack of plates to each other,
fastening the end plates respectively to both of the two half-shells,
fastening the two half-shells to each other.

14. The method according to claim 13, wherein the plates of the stack of plates are fastened to each other by gluing and each end plate is fastened to one of the two half shells by gluing, while the two half-shells are fastened to each other by welding.

15. The method according to claim 14, wherein the welding of the two half-shells occurs after gluing the plates of the stack of plates together and each end plate to a corresponding one of the two half-shells.

16. The method according to claim 13, wherein all the plates of the stack of plates are beforehand glued to each other so as to form a block, this block being then fastened to the two half-shells by gluing each end plate to a corresponding one of the two half-shells.

* * * * *